United States Patent [19]
Zahn et al.

[11] Patent Number: 5,821,187
[45] Date of Patent: Oct. 13, 1998

[54] PROCESS AND APPARATUS FOR RECOATING A DEACTIVATED CATALYST COATING IN A CATALYST

[75] Inventors: Wolfgang Zahn, Ludwigsburg; Gunter Loose, Remseck; Axel Hirshmann, Göppingen, all of Germany

[73] Assignee: Mercedes-Benz AG, Stuttgart, Germany

[21] Appl. No.: 610,627

[22] Filed: Mar. 4, 1996

[30] Foreign Application Priority Data

Mar. 2, 1995 [DE] Germany .................. 195 07 219.7

[51] Int. Cl.$^6$ ................. B01J 20/34; B23B 35/00
[52] U.S. Cl. ................. 502/22; 502/25; 502/26; 502/514; 427/140; 427/236; 427/376 N
[58] Field of Search ................. 502/22, 25, 26, 502/514; 427/140, 236, 376.7

[56] References Cited

U.S. PATENT DOCUMENTS

| | | | |
|---|---|---|---|
| 3,140,263 | 7/1964 | Payne | 502/26 |
| 3,915,350 | 10/1975 | Davies et al. | |
| 4,058,485 | 11/1977 | Eheung | 252/466 PT |
| 4,193,793 | 3/1980 | Eheung | 252/466 PT |
| 4,916,105 | 4/1990 | Reick et al. | 502/203 |
| 5,447,694 | 9/1995 | Swaroop et al. | 422/177 |
| 5,587,137 | 12/1996 | Swaroop et al. | 423/239.2 |

FOREIGN PATENT DOCUMENTS

| | | |
|---|---|---|
| 1100600 | 3/1961 | Germany . |
| 1414622 | 11/1975 | United Kingdom . |

*Primary Examiner*—Helane Myers
*Attorney, Agent, or Firm*—Evenson, McKeown, Edwards & Lenahan, P.L.L.C.

[57] ABSTRACT

A process serves for recoating a deactivated catalyst coating of a catalyst for converting harmful constituents from the exhaust gas of an internal combustion engine, particularly in a motor vehicle. In this process, washcoat and/or noble metal compounds are sprayed by means of an aerosol into the catalyst. The noble metal compounds are subsequently brought into their elemental state by means of a reducing medium flowing through the catalyst, after which the washcoat applied is dried by heat treatment or calcination. In an apparatus for carrying out the process, a first line for a carrier gas and a second line for the washcoat and/or the noble metal compounds are provided. The first line is arranged at least partly in a region before the catalyst within the second line and at its ends nearest the catalyst is provided with an atomization device. The second line opens into the catalyst, with there being provided after the catalyst a third line which opens into a separator from which the first and the second lines lead away.

1 Claim, 1 Drawing Sheet

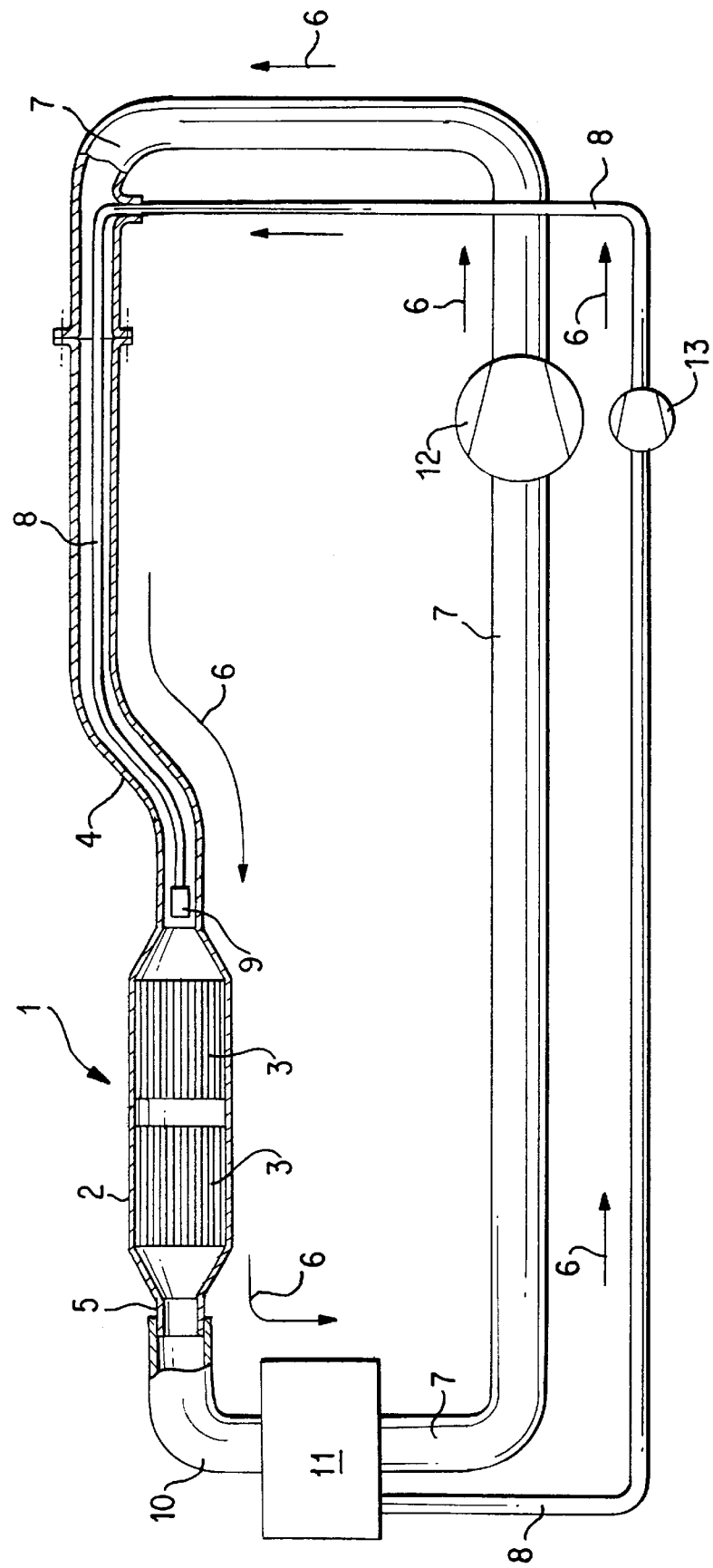

PROCESS AND APPARATUS FOR RECOATING A DEACTIVATED CATALYST COATING IN A CATALYST

BACKGROUND AND SUMMARY OF THE INVENTION

The invention relates to a process for recoating a deactivated catalyst coating in a catalyst for removing harmful constituents from the exhaust gas of an internal combustion engine, particularly in a motor vehicle, by applying noble metals to the catalyst. The invention further relates to an apparatus for carrying out the process described.

A process of the generic type is disclosed in German Patent Document DE-B 1 100 600.

Catalysts have a limited life so that after some time it may be found in an exhaust gas test in a workshop that the emission values for a vehicle equipped with a catalyst are too high.

One cause of these unacceptably high emission values can be inactivation of the catalyst coating. Apart from eliminating the actual causes, for example a damaged ignition system, the catalyst also has to be replaced subsequently. This is extremely laborious and therefore costly, particularly in the case of systems in which the catalytic converter is welded to the adapter pipes.

The point should be made that hereinafter the term "catalyst" refers not only to the monoliths which carry out the actual exhaust gas purification process,but to the entire catalyst unit with the sometimes firmly fastened adapter pipes.

The above-mentioned German Patent Document DE-B 1 100 600 discloses a process for activating catalysts comprising metals of the platinum group. In this process, small amounts of dust which has already been used for catalytic purposes and comprises metals of the platinum group are applied to the surface of catalyst bodies of the metals of the platinum group.

However, a disadvantage of the process disclosed in said publication is that the entire catalyst has to be disassembled, since the platinum black formed has to be cleaned off from the catalyst using a soft brush and the catalyst body then has to be tapped to knock off adhering material. Subsequently, activated dust of metals of the platinum group is applied by powdering, distribution with brushes, blowing on or in another suitable manner, so that the process described is very laborious and therefore costly since, as already mentioned, the catalyst has to be disassembled for this purpose.

It is therefore an object of the present invention to provide a process for recoating a deactivated catalyst coating of a catalyst, by means of which the recoating of the catalyst can be carried out in a simple and therefore inexpensive way.

It is also an object of the invention to provide an apparatus for carrying out the said process.

These objects are achieved according to preferred embodiments of the invention by providing an arrangement wherein a coating and/or noble metal compounds are sprayed by means of an aerosol into the catalyst, wherein the noble metal compounds are then brought into their elemental state by means of a reducing medium flowing through the catalyst, and wherein the coating applied is dried by heat treatment.

The spraying of a coating and/or of noble metal compounds by means of an aerosol into the catalyst can make the laborious, time-consuming and therefore expensive disassembly of the catalyst or the catalyst unit unnecessary, since the catalyst unit only has to be removed from the vehicle, but can remain assembled as a unit.

If the noble metal compounds introduced into the catalyst by means of the aerosol are subsequently reduced by a suitable medium and thus brought into their elemental state, this results in pure noble metals which can be dried by a suitable heat treatment or calcination,so that a suitable recoating of a deactivated catalyst is realized.

The noble metal compounds can comprise platinum, rhodium or palladium.

An apparatus for carrying out the process includes a first line for a carrier gas, a second line for the coating and/or the noble metal compounds, with the first line being arranged, at least partly in a region before the catalyst, within the second line and the end of the first line nearest the catalyst being provided with an atomization device, and the second line opening out into the catalyst, a third line provided after the catalyst, which third line opens into a separator from which the first line and the second line lead away, and devices for generating pressure differences provided in at least one of the lines.

By means of the apparatus described, an aerosol can be produced in a simple way, with the aerosol being produced only in a region before the catalyst or in the adapter pipe of the catalyst and there being arranged shortly after the catalyst a separator in which the aerosol is separated into its liquid and gaseous constituents so as to ensure that coating or recoating with noble metal occurs virtually only within the catalyst and, in contrast, coating in the feed and discharge lines does not occur since a carrier gas, e.g., air or an inert or reduced gas, and coating or noble metal compounds are conveyed separately or flow through these lines.

Other objects, advantages and novel features of the present invention will become apparent from the following detailed description of the invention when considered in conjunction with the accompanying drawings.

BRIEF DESCRIPTION OF THE DRAWINGS

The single drawing FIGURE schematically depicts a system for recoating a deactivated catalyst coating according to a preferred embodiment of the present invention.

DETAILED DESCRIPTION OF THE DRAWINGS

An apparatus for recoating a deactivated catalyst coating is schematically shown in the single drawing figure. A catalyst 1 has a catalyst housing 2 and two monoliths 3 arranged in the catalyst housing 2.

At the entrance to the catalyst housing 2 there is fastened a first adapter pipe 4 through which the exhaust gas of the internal combustion engine of the motor vehicle is conveyed to the monoliths 3 during operation of the catalyst. At the exist of the catalyst housing 2 there is attached a second adapter pipe 5 through which the exhaust gas purified in the monoliths 3 is conveyed to the exhaust unit of the motor vehicle when the motor vehicle is running.

In the interests of clarity, the flow direction through the catalyst unit or the catalyst 1 is indicated by means of the arrows provided with the reference numeral 6, with the arrows 6 also defining the flow direction in the circuit described below.

The end of the first adapter pipe 4 which is farthest from the catalyst housing 2 is connected to a line which will hereinafter be referred to as the second line 7.

Through the second line 7 which directly joins the first adapter pipe 4, the coating and/or noble metal compounds are introduced into the first adapter pipe 4 and thus also into the catalyst housing 2.

The second line 7 is provided at one point with an opening through which a first line 8 is introduced into the second line 7 so that the first line 8 runs at least partly within the second line 7. A carrier gas, for example air, flows through the first line 8 and the first line 8 has a length such that it can be introduced through the first adapter pipe 4 into a region before the catalyst housing 2.

At its end nearest the catalyst housing 2, the first line 8 has an atomization device which, in the present example, is configured as an atomization probe 9.

In the atomization probe 9, the carrier gas coming from the first line 8 is atomized and forms an aerosol with the coating and/or the noble metal compounds which have been fed in through the second line 7.

The atomization probe 9 is preferably arranged centrally in or on the adapter pipe 4 of the catalyst 1. This can be achieved, for example, by means of resilient spacers which are not shown.

The central arrangement of the atomization probe 9 ensures the formation of a uniformly mixed aerosol, i.e. a mixture of the carrier gas and the coating and/or the noble metal compounds, with the coating and/or the noble metal compounds being able to be present as liquid.

The aerosol produced in the manner described then flows through the catalyst housing 2 or is sprayed into the catalyst housing 2 and thus also flows through the monoliths 3 which, owing to their porosity, can readily absorb the liquid particles on the surface.

It is here possible, for example, to apply the coating first in a first process step and apply the noble metal compounds in a second process step.

However, it is of course also possible to apply both parts, namely both the coating and the noble metal compounds, to the monoliths 3 in one process step.

The parts of the aerosol which do not deposit on the monolith 3 leave the catalyst housing 2 via the second adapter pipe 5 through a third line 10 into a separator 11 in which the liquid and gaseous components of the aerosol are separated, i.e. separation occurs into the carrier gas on the one hand and, on the other hand, the noble metal compounds and/or the coating which are present in liquid form.

The media separated in the separator 11 are subsequently conveyed back via the first line 8 and the second line 7 respectively to the catalyst 1 in the manner described, i.e. a continuous circuit is established. It is here of course possible to provide for fresh coating and/or noble metal compounds and/or carrier gas to be fed in at a suitable point within the circuit, if this appears necessary.

In the second line 7, through which the coating and/or noble metal compounds are conveyed into the catalyst 1, there is provided, as device for generating pressure differences, a metering pump 12, with the continuous circulation being maintained by means of the pressure differences.

Similarly, a blower 13 is provided in the first line 8 as device for generating pressure differences, so as to enable the amount of carrier gas flowing into the catalyst 1 to be controlled or regulated.

Preferably, the part of the first line 8 between the blower 13 and the atomization probe 9, at least in the region in which the first line 8 runs within the second line 7, is made flexible or elastically deformable, for example in the form of a hose, so that the atomization probe 9 can also be introduced through pipe bends in the first adapter pipe 4 of the catalyst 1 right up to a short distance before the entry side of the monolith 3 on the inlet side, i.e. before the monolith 3 nearest the first adapter pipe 4.

The previously mentioned resilient spacers which are not shown ensure that the atomization probe 9 is nevertheless placed centrally within the first adapter pipe 4.

After both coating and noble metal compounds have been introduced into the catalyst 1 as described, a reducing medium, e.g. $H_2$, which converts the dissolved noble metals back into the elemental state is subsequently passed through the catalyst 1.

This feeding in of the reducing medium, which can likewise circulate in a continuous circuit through the apparatus described, can be achieved, for example, by switching the apparatus over to a second circuit which is not shown.

A heat treatment or calcination is subsequently carried out, whereby the freshly applied coating together with the noble metals present thereon is dried and "ceramicized".

The thermal energy required for this purpose can be introduced either via the reduction medium which is preheated and/or the catalyst housing 2 of the catalyst 1, i.e. the catalyst housing 1 is heated from the outside.

The process described enables an existing catalyst to be regenerated in a simple and inexpensive manner, resulting in a clear cost advantage over replacement by a new unit. In addition, the disposal of the used unit is dispensed with and raw materials can be saved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for recoating a deactivated catalyst coating in an internal combustion engine exhaust gas catalytic converter, comprising:

supplying liquid containing at least one of a coating and noble metal compounds in a line opening at a position upstream of a catalyst system, to thereby form an aerosol of said liquid and carrier gas, flowing said aerosol through the catalytic monolith, subsequently flowing a reducing element through the catalytic monolith to bring said noble metal compounds to an elemental state, and subsequently drying said catalytic monolith by heat treatment.

\* \* \* \* \*